Figure 10:
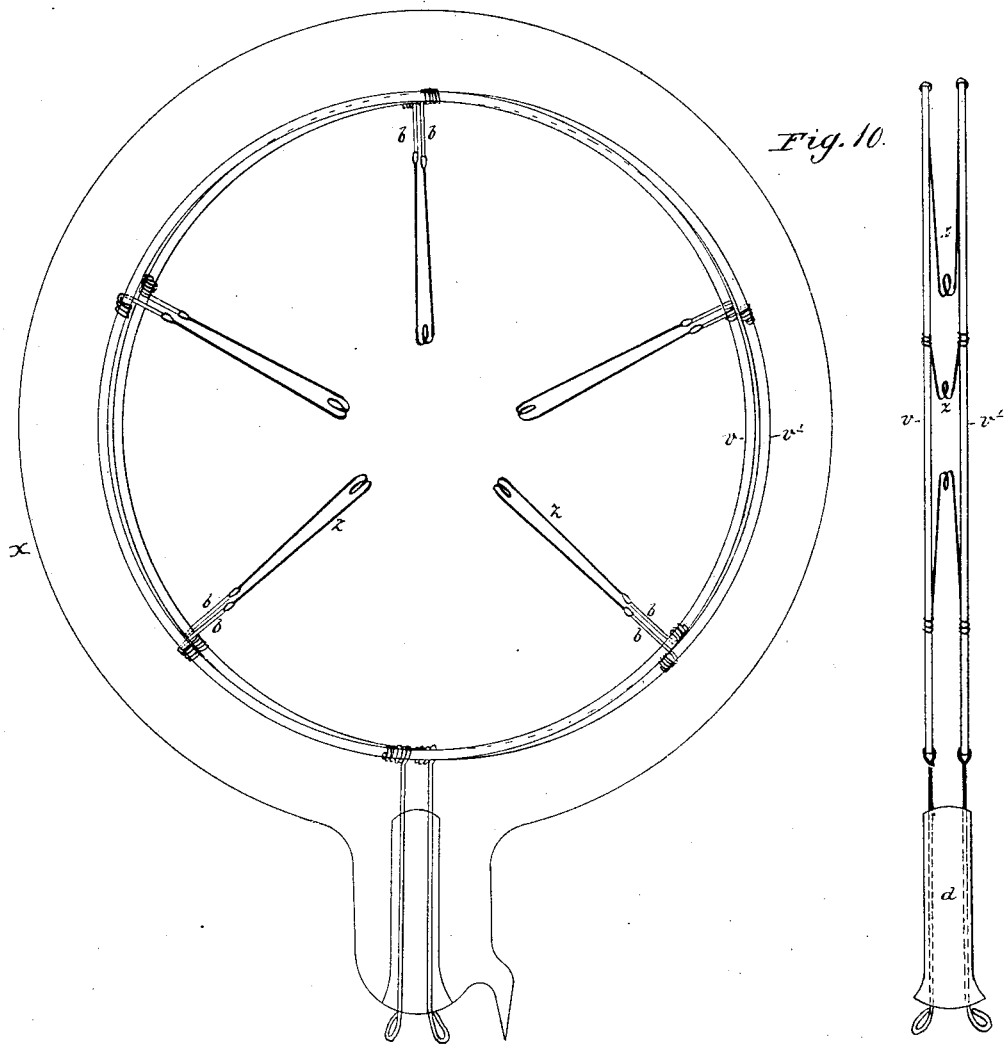

(No Model.) 3 Sheets—Sheet 1.
C. H. GIMINGHAM.
ELECTRIC LAMP.
No. 255,277. Patented Mar. 21, 1882.
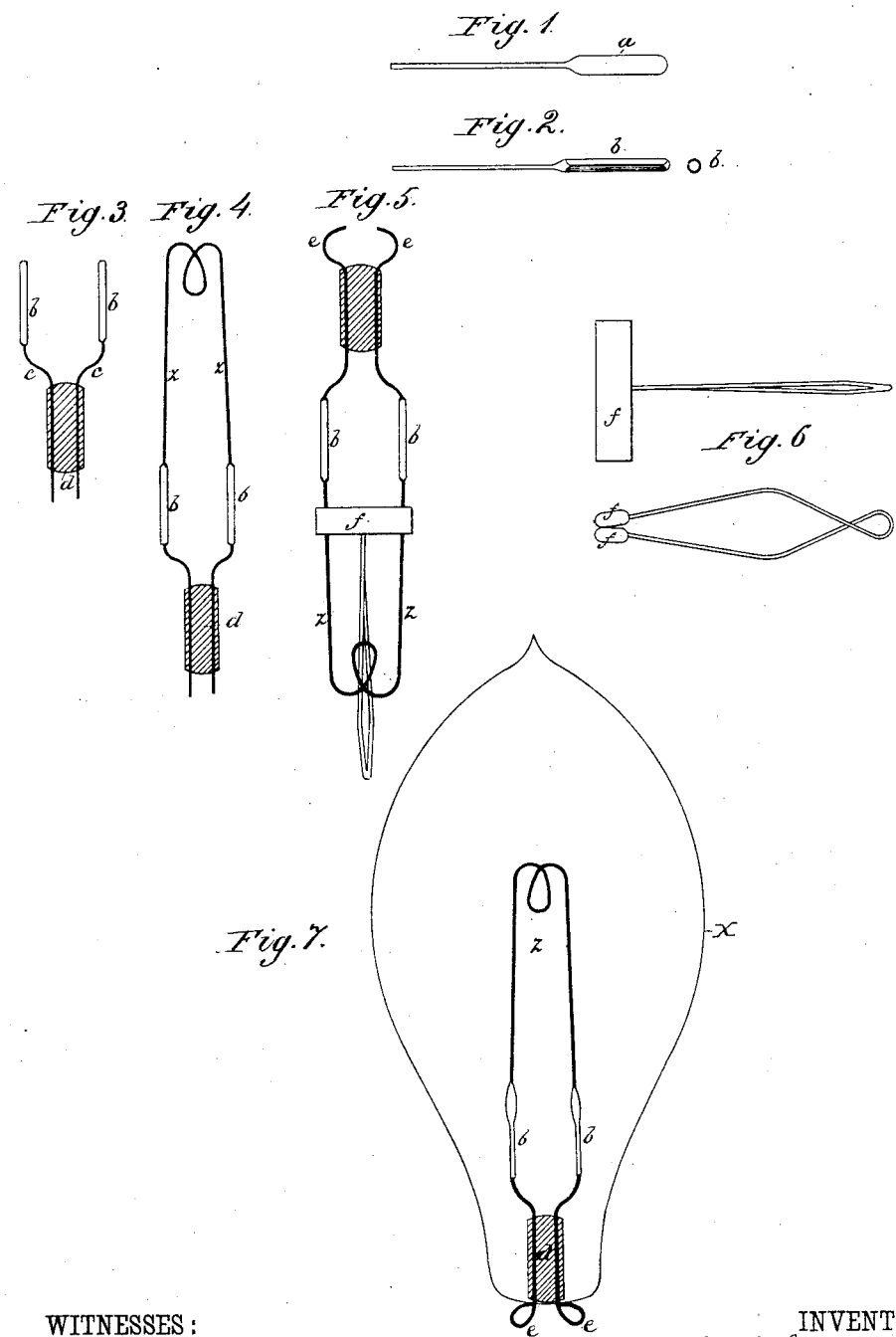
WITNESSES:
W. W. Hollingsworth
A. L. Syne
INVENTOR:
C. H. Gimingham
BY
ATTORNEYS.

(No Model.) 3 Sheets—Sheet 2.
C. H. GIMINGHAM.
ELECTRIC LAMP.
No. 255,277. Patented Mar. 21, 1882.
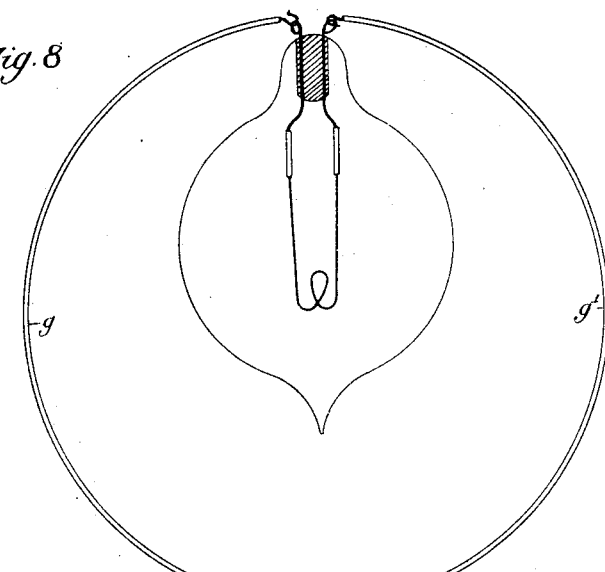
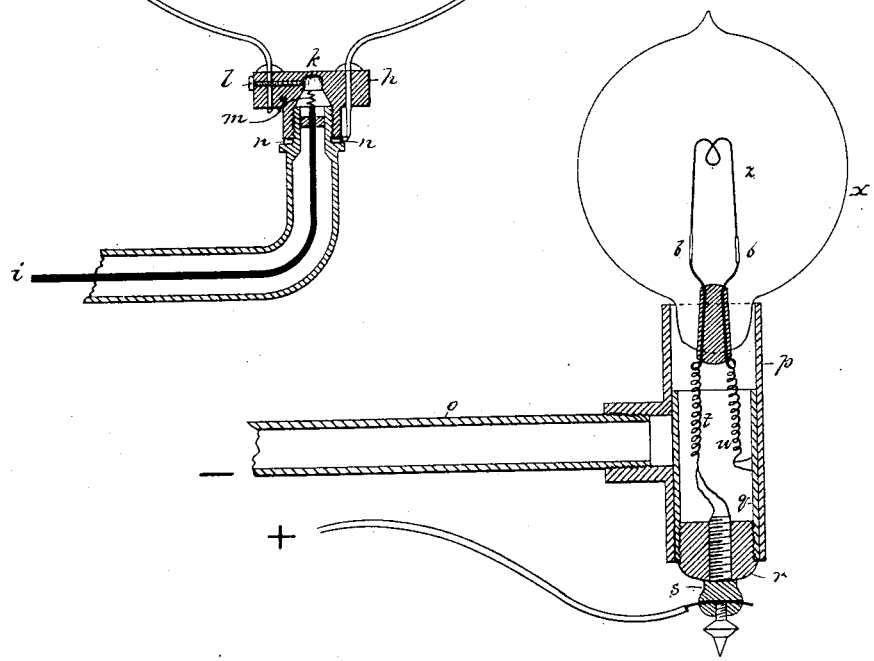
WITNESSES:
W. W. Hollingsworth
A. G. Syme
INVENTOR:
C. H. Gimingham
BY
ATTORNEYS.

(No Model.)  3 Sheets—Sheet 3.

C. H. GIMINGHAM.
ELECTRIC LAMP.

No. 255,277.  Patented Mar. 21, 1882.

WITNESSES:
W. W. Hollingsworth
A. G. Lyne.

INVENTOR:
C. H. Gimingham
BY
ATTORNEYS.

UNITED STATES PATENT OFFICE.

CHARLES H. GIMINGHAM, OF NEWCASTLE-UPON-TYNE, COUNTY OF NORTHUMBERLAND, ENGLAND.

ELECTRIC LAMP.

SPECIFICATION forming part of Letters Patent No. 255,277, dated March 21, 1882.

Application filed December 23, 1881. (No model.)

*To all whom it may concern:*

Be it known that I, CHARLES HENRY GIMINGHAM, of Newcastle-upon-Tyne, in the county of Northumberland, England, have invented a new and useful Improvement in Electric Lamps; and I do hereby declare that the following is a full, clear, and exact description of the same, reference being had to the accompanying drawings, forming part of this specification.

My improvements relate to a method of cheaply and readily manufacturing incandescent lamps, and to the mounting of carbon filaments of electric lamps generally.

In order that the invention may be more readily understood, I have illustrated it in the accompanying drawings, and will proceed to describe it with reference thereto. Figures 1 to 7 are drawn on an enlarged scale about twice full size.

In carrying out my invention I make a holder for the carbon thread in the following manner, and having mounted the carbon thread therein, I perfect the electrical contact between the holder and the carbon, as hereinafter described.

I take pieces of platinum wire about one inch long and flatten them at one end for a distance of about three-eighths of an inch, as shown at *a* in Fig. 1, by means of a die constructed for the purpose. I then bend the flattened portion to a tubular form by drawing it successively through a series of holes in a wire plate until a tube of the proper size to receive and accurately fit the carbon filament is formed, as shown at *b* in Fig. 2. I do not restrict myself to the use of threads or filaments of carbon of round form in cross-section. Flat carbons may be mounted in an exactly similar way by making flat or oval platinum tubes, instead of round ones, and metals other than platinum may be used to mount carbons, as herein described. The wire stems of two of the tubes thus formed are bent, as shown at *c* in Fig. 3, and fastened together by being embedded in a piece of glass, *d*, before the blowpipe flame, to constitute a holder. The ends of the carbon thread to be mounted are now dipped into a paste made of ammonio-chloride of platinum (or other salt of platinum) and some carbonaceous compound—such as starch, fat, turpentine, &c.—and the ends thus prepared are then slipped into the platinum tubes forming the holder, as shown in Fig. 4, and the latter are thereupon held for an instant in a Bunsen gas-flame, which carbonizes the paste contained between the carbon thread and the inclosing-tube and reduces the ammonio-chloride of platinum to metallic platinum, thereby forming a moderately good electrical connection between the holder and the carbon. This operation serves the double purpose of fixing the carbon in the tube for the subsequent operation and increasing the conductivity of the final deposit of carbon between the platinum and the carbon thread.

The next operation is to perfect the electrical contact between the carbon thread and the platinum tubes forming the holder by the deposition over and upon the junction of these parts of carbon from a liquid hydrocarbon in the following manner.

The ends of the platinum wires which project from the piece of glass are bent to a hook shape, as shown at *e*, Fig. 5, or in any other convenient form, to facilitate their rapid attachment to the conducting-wires of a dynamo-machine and their suspension therefrom over a depositing-cell of liquid hydrocarbon. Before thus suspending them a short-circuiting clip, shown in plan and elevation in Fig. 6, and consisting of two pieces or jaws of ordinary electric light carbon *f*, pressed together by means of a light brass-wire spring, is applied to the carbon filament, as shown in Fig. 5. This clip is used to prevent any part of the carbon thread being heated by the current, except just at the junction between it and the platinum tube. The ends *e* of the platinum wires are now hooked onto the conducting-wires from the two poles of a dynamo-machine, and the carbon thread, together with the short-circuiting clip, is suspended therefrom and immersed in a bath of some liquid hydrocarbon (preferably some light one, such as benzole) to a point a little above the junction of the platinum holder and the carbon. The current from the machine is passed at first through a resistance, in order to cause carbon to be deposited between the platinum and the carbon thread in the tube, the resistance being afterward gradually decreased until any required thickness of deposited carbon is obtained over the junction, as shown in Fig. 7, whereby the electrical contact is rendered perfect. The carbon thus mounted and fixed can be directly sealed into the bulb $x$, which obviates the necessity for making the lamp in two parts—viz., bulb and stem—and afterward sealing them together, as is usually done. On account of this mounting being exceedingly compact and neat I am enabled to use a much smaller bulb than usual, making, when finished, quite a miniature lamp compared with those now in the market, although giving as much light as any ordinary incandescent lamp.

Fig. 7 represents twice the natural size of the lamp completed, the hooked ends $e$ of the wires being bent into complete loops and returned into the glass for permanent attachment to the conductors. This lamp being so small and light, there is no danger in supporting it by these platinum loops.

In order to economize platinum wire it is necessary to have little or no stem or shank to the lamp made as above described, and it is therefore difficult to make attachments to the lamp itself in the nature of fittings, &c. To overcome this difficulty I find it better to use brackets and fittings for chandeliers that shall take the lamps as they leave the glass-blower's hands, just as one would fit an ordinary lamp-glass. To this end I have devised the two following fittings, that may be attached to any existing gas-fittings, if necessary.

The attachment represented in Fig. 8 consists of two thin hard brass springs, $g\ g'$, fixed in a wooden, ebonite, or other insulator, $h$, and screwed onto the gas-fitting in such a manner that one of these springs, $g$, shall be in contact with an insulated wire, $i$, passing along the inside of the gas-pipe, and the other, $g'$, with the gas-pipe itself, the conducting-wire $i$ being connected with the one pole and the gas-pipe with the other pole of the dynamo-machine.

The connection of the spring $g$ with the wire $i$ is made by means of a brass plug, $k$, contained in the insulator $h$, with which the spring $g$ is connected by a screw, $l$, which passes through the spring and fixes the plug at same time.

$m$ is a small spiral spring attached to wire $i$, with which the plug $k$ comes in contact when the insulator is screwed on.

The spring $g'$ is connected to a thin brass collar, $n$, which makes connection with the gas-fitting when the insulator is screwed on tight. I do not, however, claim this method of connecting the springs to the bracket, although I have described it.

The two springs $g\ g'$ are bent or bowed to such a form as to fit or allow a gas-globe to go over them, and they have each a small hook at the upper end and tend to spring apart, so that when the lamp is hooked on them, as shown, good contact is maintained by this tendency of the springs to diverge. The object of this mode of suspending incandescent lamps is to render the lamps complete in themselves as they leave the glass-blower's hands.

Fig. 9 shows a method of fixing these lamps rigidly, which may be used either way up. $o$ is an ordinary gas-bracket, with the elbow used for the gas-burner removed. $p$ is a brass tube slightly bell-mouthed at the top, and $q$ another brass tube sliding in it rather tightly. Into the lower part of this inner brass tube is screwed a plug, $r$, of the same size as the inner tube, $q$, and made of insulating material, through which passes a binding-stud, $s$, (which may be made ornamental,) to the inner end of which is attached the spiral spring $t$. The spiral spring $u$ is attached to any part of the sliding tube $q$, and is thus connected to the whole of the brass work. To prevent these springs $t\ u$ from touching one another I cover each with an insulating-sheath, generally of glass.

The sliding tube $q$ has a pin projecting, which is received in a slot cut in the outer tube, $p$, to prevent the inner tube either coming out or turning round.

To fix a lamp, or replace one when broken, I press the binding-stud, and with it the insulating-plug and sliding tube $q$, upward until the hooks on the ends of the springs $t\ u$ project just above the top of the outer tube, $p$. I then attach the platinum loops of the lamp and draw down the binding-stud $s$ until the lamp is fitted tightly into its place.

The electrical connections are made by attaching one wire from the machine to the brass work and the other to the binding-stud $s$, as shown. I do not restrict myself to the exact design of these fittings, as they may be varied at will.

Figure 11:
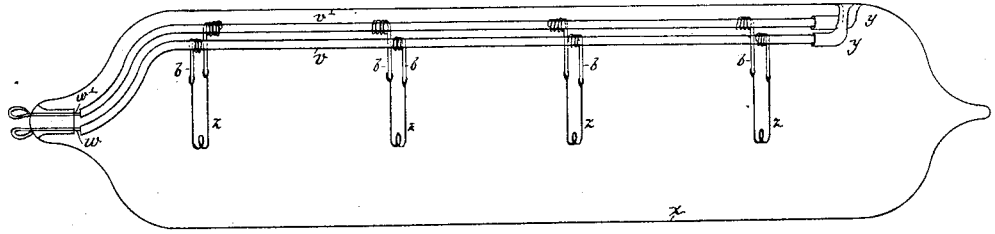

The method of mounting carbon threads in platinum tubes, hereinbefore described, enables one to construct with neatness and ease the largest as well as the smallest incandescent lamps in a great variety of forms. Two forms for large lamps are shown in Figs. 10 and 11, in which the carbons are mounted in parallel circuit. $v\ v'$ are stout aluminum or other conductors whose ends are attached to platinum or other conductors passing through the glass.

To the aluminum conductors any number of carbons are attached by passing the ends of the platinum holders in which they have been previously mounted, as hereinbefore described, through small holes drilled through the aluminum or other conductors, $v\ v'$, and twisting the ends of the wires once or twice round the conductor to make good contact. Other methods may, however, be used to attach the platinum holders to the conductors—such as riveting, soldering, &c. The whole—i.e., the conductors, with the carbon holders and carbons attached, as shown—are sealed into a bulb or tube in the ordinary way.

In Fig. 10 $v\ v'$ are two rings of stout aluminum or other wire placed parallel to one another at a short distance apart, and attached to two platinum wires, $w\ w'$, passing through the glass. The carbons $z$, mounted in their holders and attached to the rings $v\ v'$, as shown and described, form bridges between these two rings.

In Fig. 11 $v\,v'$ are straight wires whose inner ends are slipped into two glass sockets, $y$, sealed to the inclosing-tube $x$, and whose outer ends are separately attached to the platinum terminals $w\,w'$. In each arrangement the number of carbons is only limited by the ability of the conductors to carry the current.

Making lamps in the manner herein described renders renewals unnecessary, as they can be made for little more than lamp-glasses.

Having thus described my invention, what I claim as new is—

1. The combination, with the carbon and tubular holder, of a paste formed of a salt of platinum and a carbonaceous compound, and a deposit of carbon at the junction of said carbon and its holder, as and for the purpose specified.

2. The method of attaching carbon threads to a tubular holder, which consists in first dipping the thread ends in a paste formed of a carbonaceous compound and a platinum salt, and then slipping them into the tube; and, secondly, holding them in a Bunsen gas-flame until the paste is carbonized and the platinum salt is reduced to metallic platinum, as described.

3. The combination, with a gas-pipe and fitting, substantially as described, of the brass springs $g\,g'$, the insulator $h$, having the brass plug $k$, the insulated wire $i$, having spring $m$, the screw $l$, and the brass collar $n$, as and for the purpose specified.

The above specification of my invention signed by me this 22d day of November, 1881.

CHARLES HENRY GIMINGHAM.

Witnesses:
JOHN W. EDMUNDSON,
WILLIAM J. COX.